United States Patent
Kleinhout et al.

(10) Patent No.: US 12,386,581 B2
(45) Date of Patent: Aug. 12, 2025

(54) VIDEOCONFERENCE AUTOMATIC MUTE CONTROL SYSTEM

(71) Applicant: Google LLC, Mountain View, CA (US)

(72) Inventors: Huib Victor Kleinhout, Upplands Vasby (SE); Niklas Blum, Stockholm (SE); John Fredric Lindstrom, Stockholm (SE); Tomas Gunnarsson, Stockholm (SE); Christian Schüldt, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/946,677

(22) Filed: Sep. 16, 2022

(65) Prior Publication Data

US 2024/0094976 A1   Mar. 21, 2024

(51) Int. Cl.

| | |
|---|---|
| *G06F 3/16* | (2006.01) |
| *G10L 17/04* | (2013.01) |
| *G10L 17/22* | (2013.01) |
| *G10L 25/57* | (2013.01) |
| *H04N 7/15* | (2006.01) |
| *H04N 23/611* | (2023.01) |

(52) U.S. Cl.
CPC ............ *G06F 3/165* (2013.01); *G10L 17/04* (2013.01); *G10L 17/22* (2013.01); *G10L 25/57* (2013.01); *H04N 7/15* (2013.01); *H04N 23/611* (2023.01)

(58) Field of Classification Search
None
See application file for complete search history.

(56) References Cited

U.S. PATENT DOCUMENTS

| 6,850,265 B1 | 2/2005 | Strubbe et al. |
| 11,405,584 B1* | 8/2022 | Grover ................. H04N 7/147 |

(Continued)

OTHER PUBLICATIONS

Ephrat et al., "Looking to Listen at the Cocktail Party: A Speaker-Independent Audio-Visual Model for Speech Separation", arXiv:1804.03619v2, Aug. 9, 2018, 11 pages.

(Continued)

*Primary Examiner* — Duc Nguyen
*Assistant Examiner* — Assad Mohammed
(74) *Attorney, Agent, or Firm* — DORITY & MANNING P.A.

(57) ABSTRACT

Systems and methods of the present disclosure are directed to automatic control of mute controllers for participants in videoconferences. For example, a method for automatically controlling a mute control associated with a participant during a videoconference includes obtaining communication data associated with the participant participating in the videoconference. The communication data includes audio signals associated with the participant and/or visual signals associated with the participant. The method includes processing the communication data by a gate control model to generate an output. The output is indicative of an intent of the participant to communicate with other participants of the videoconference. The method includes generating a noise gate status based at least in part on the output associated with the gate control model. The method includes automatically controlling the mute control of the participant based at least in part on the noise gate status.

16 Claims, 4 Drawing Sheets

(56) References Cited

U.S. PATENT DOCUMENTS

| | | | |
|---|---|---|---|
| 11,949,727 B2* | 4/2024 | Hixson | G06F 3/013 |
| 2019/0189117 A1* | 6/2019 | Kumar | G06F 16/3329 |
| 2020/0110572 A1* | 4/2020 | Lenke | G06F 3/167 |
| 2021/0399911 A1 | 12/2021 | Jorasch et al. | |
| 2022/0030179 A1* | 1/2022 | Kundu | G06T 7/194 |
| 2022/0060525 A1 | 2/2022 | Chavez et al. | |
| 2022/0215792 A1* | 7/2022 | Nam | H04N 21/4394 |
| 2022/0334638 A1* | 10/2022 | Anderson | G06V 10/98 |

OTHER PUBLICATIONS

International Search Report and Written Opinion for Application No. PCT/US2023/029623, mailed Nov. 7, 2023, 23 pages.
Park et al., "Towards End-to-End Video-based Eye-Tracking", arXiv:2007.13120v1, dated Jul. 26, 2020, 28 pages.

* cited by examiner

VIDEOCONFERENCE AUTOMATIC MUTE CONTROL SYSTEM

FIELD

The present disclosure relates generally to multi-participant video conferencing systems. More particularly, the present disclosure relates to improved features relating to an automatic mute control within a videoconference, which can also be referred to as a video call or video telephony.

BACKGROUND

Multi-participant video conferencing techniques can provide video streams to a participant device for multiple participants of a videoconference. Along with the video streams for multiple participants of the videoconference, the conferencing system can also provide audio streams associated with the live audio of a participant to multiple participants of the videoconference (e.g., as captured by microphones included in or connected to the participant's participant device).

While providing audio streams can be helpful to foster discourse within a videoconference, it can also be distracting when extraneous audio sounds are included in the real-time audio streams. As an example, a participant may engage in a conversation with another party present in their space that is not relevant to the particular videoconference. As another example, background noise such as pet sounds, chairs moving, home appliances, etc. may be picked up by the microphone and communicated to other participants.

Certain current video conferencing techniques enable participants to personally and manually control whether their audio feeds are provided to the other participants. For example, video conferencing participant interfaces can contain a "mute button" or other interface element that enables a participant to manually "mute" their audio stream (e.g., cease playback of their audio stream to the meeting at large).

While such a manual mute control is an effective measure to control audio, it comes with a lot of frustrations: participants may be unaware that they have to mute themselves when joining meetings and/or may frequently forget to unmute themselves when they start speaking. In many meetings it's common to hear "you're muted!" or "please mute yourself".

Improved noise cancellation reduces this problem to some extent. These techniques can filter noise that is algorithmically classified as background noise. Application of noise cancellation techniques makes it "safer" to remain unmuted as unwanted sounds such as typing, moving of chairs, or pet sounds are suppressed with some success. However, noise cancellation algorithms do not work in all cases and are particularly poor at removing unwanted speech such as background conversations.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for automatically controlling a mute control associated with a participant during a videoconference. The method includes obtaining communication data associated with the participant participating in the videoconference. In particular, the communication data includes at least one of audio signals associated with the participant or visual signals associated with the participant. The method includes processing the communication data by a gate control model to generate an output. In particular, the output is indicative of an intent of the participant to communicate with other participants of the videoconference. The method includes generating a noise gate status based at least in part on the output associated with the gate control model. The method comprises automatically controlling the mute control of the participant based at least in part on the noise gate status.

Another example aspect of the present disclosure is directed to a computing system including one or more processors and one or more non-transitory, computer-readable media that store instructions that, when executed by the one or more processors, cause the computing system to perform operations. The operations include obtaining communication data associated with the participant participating in the videoconference. In particular, the communication data includes at least one of audio signals associated with the participant or visual signals associated with the participant. The operations include processing the communication data by a gate control model to generate an output. In particular, the output is indicative of an intent of the participant to communicate with other participants of the videoconference. The operations include generating a noise gate status based at least in part on the output associated with the gate control model. The operations include automatically controlling the mute control of the participant based at least in part on the noise gate status.

Another example aspect of the present disclosure is directed to one or more non-transitory computer-readable media that store instructions that, when executed by one or more processors of a computing system, cause the computing system to perform operations. The operations include receiving training data associated with a participant of a videoconference. In particular, the training data includes a training audio signal and wherein the training audio signal further includes additional audio signals associated with speakers other than the participant. The operations include training a gate control model based on the training data. The operations include obtaining communication data associated with the participant. In particular, the communication data includes at least one of audio signals associated with the participant or visual signals associated with the participant. The operations include processing the communication data by the gate control model to generate an output. In particular, the output is indicative of an intent of the participant to communicate with other participants of the videoconference. The operations include generating a noise gate status based at least in part on the output associated with the gate control model. The operations include automatically controlling a mute control of the participant based at least in part on the noise gate status.

Other aspects of the present disclosure are directed to various methods, non-transitory computer-readable media, participant interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
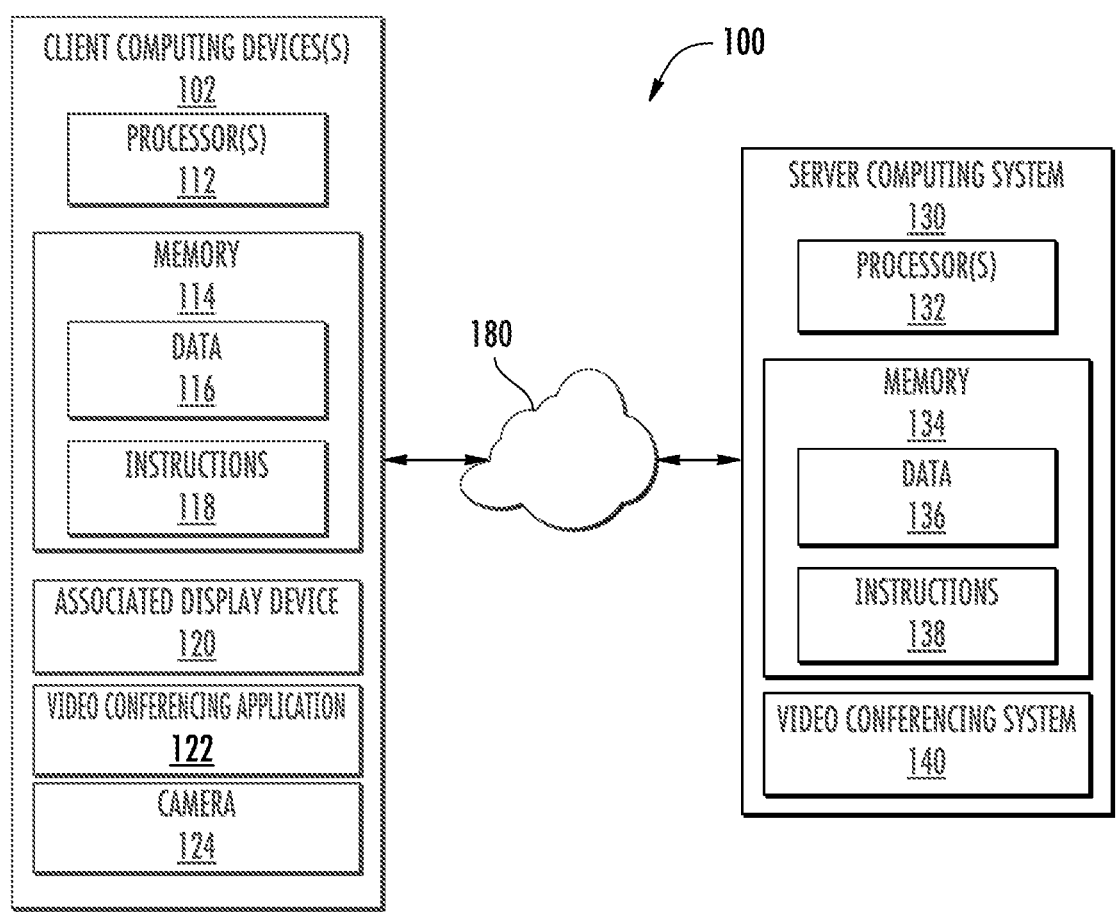
FIG. 1 depicts a block diagram of example computing systems according to example embodiments of the present disclosure.

Reference numerals that are repeated across plural figures are intended to identify the same features in various implementations.

DETAILED DESCRIPTION

Generally, the present disclosure is directed to systems and methods for automatically controlling a mute control associated with a participant during a videoconference (e.g., teleconference, audio conference, multimedia conference, etc.). In particular, a computing system can execute predictive models for predicting probabilities of participant active engagement with the videoconference based on communication data associated with a participant (e.g., audio data captured at a capture device of the participant, etc.). For example, the computing system can predict that a participant has an intent to communicate with other participants of the videoconference based on contextual data (e.g., recognition of the participant's voice, recognition of the participant's face, recognition of the eye gaze of the participant, recognition of the participant's gesture) obtained from the communication data associated with the participant. Based on the prediction of the participant's intent to communicate, the computing system can automatically control a mute control for the participant. The mute control can control whether or not the audio data associated with the participant is being transmitted to the other participants in the videoconference.

As used herein, a participant may refer to any user, group of users, device, and/or group of devices that participate in a live exchange of data (e.g., a teleconference, videoconference, etc.). More specifically, participant may be used throughout the subject specification to refer to either user(s) or user device(s) utilized by the user(s) within the context of a teleconference. For example, a group of participants may refer to a group of users that participate remotely in a videoconference with their own user devices (e.g., smartphones, laptops, wearable devices, teleconferencing devices, broadcasting devices, etc.). For another example, a participant may refer to a group of users utilizing a single computing device for participation in a videoconference (e.g., a videoconferencing device within a meeting room, etc.). For another example, participant may refer to a broadcasting device (e.g., webcam, microphone, etc.) unassociated with a particular user that broadcasts data to participants of a teleconference. For yet another example, participant may refer to a bot or an automated user that participates in a teleconference to provide various services or features for other participants in the teleconference (e.g., recording data from the teleconference, providing virtual assistant services, providing testing services, etc.).

One example application of the techniques described herein is for determining whether an audio input associated with a particular participant is directed to communicating with the other participants of the videoconference. As a particular example, the computing system can determine whether an audio input is the participant communicating with the other participants of the videoconference or is extraneous audio data such as another conversation that is occurring in the background which is not desirable to transmit to the other participants of the videoconference.

Video conferencing may provide a richer and more natural venue for remote communication among participants than other available alternatives, such as a telephone conference or email. Reference herein to a videoconference or video conferencing includes and may also be referred to in certain settings as a video call or video telephony. Businesses or other enterprises with people in different locations may use video conferencing to quickly and naturally communicate information with each other. According to aspects of this disclosure, a video communication application provides video conferencing capability among participants at different locations. A video communication application may convey video and audio data from each of the participants in a video communication session to each of the other participants. However, the more participants there are in a video communication session, the more audio signals may be distributed to all the other participants. If one of the participants is also engaging in more or less intermittent conversation at their own location, or is in an environment where other people are conversing in the background, or otherwise has ambient noise from their environment, these unhelpful sounds may be inadvertently included in an audio signal broadcast from a device of the participant to the audio feeds for all the other participants in the video communication session.

As used herein, broadcast or broadcasting refers to any real-time transmission of data (e.g., audio data, video data, AR/VR data, etc.) from a user device and/or from a centralized device that facilitates a teleconference (e.g., a centralized server device, etc.). For example, a broadcast may refer to the direct or indirect transmission of data from a user device to a number of other user devices. It should be noted that, in some implementations, broadcast or broadcasting can include the encoding and/or decoding of transmitted and/or received data. For example, a user device broadcasting video data may encode the video data using a codec. User devices receiving the broadcast may decode the video using the codec.

Any of the participants may be able to address this issue by manually muting their own audio input. However, it may become inconvenient and annoying for a given participant to manually mute their audio input, particularly if the participant wants to communicate with the other participants, and/or their side conversations or background noise at their location are intermittent, and the participant has to manually activate and deactivate the mute on their audio input over and over. Additionally, participants may forget to mute or not think of manually muting their audio signal when they engage in side conversations or experience intrusive background noise at their location, and the potentially unhelpful or intrusive sounds are conveyed to all the other participants in the video communication session, interfering with those who are trying to convey and listen to the contents of the video communication session, despite the existence of the capability for manual mute in the video communication application.

Advantageously, example embodiments according to aspects of the present disclosure can provide for a streamlined method to automatically mute video conferencing participants who aren't addressing the other participants and whose audio inputs might otherwise be a source of distracting or disrupting noise, while allowing the video conferencing application to continue distributing the audio inputs from intended speakers to the other participants.

It should be noted that, although implementations of the present disclosure are discussed primarily with regards to videoconference applications in which audio and/or video data is exchanged, the present disclosure are not limited to such use-cases. Rather, implementations of the present disclosure may be utilized in accordance with any type of teleconference (e.g., videoconference, audioconference, media conference, Augmented Reality (AR)/Virtual Reality (VR) conference, etc.). A teleconference can refer to any communication or live exchange of data (e.g., audio data, video data, AR/VR data, etc.) between a number of participants. For example, a teleconference may refer to a videoconference in which multiple participants utilize computing devices to transmit video data and/or audio data to each other in real-time. For another example, a teleconference may refer to an AR/VR conferencing service in which AR/VR data (e.g., pose data, image data, etc.) sufficient to generate a three-dimensional representation of a participant is exchanged amongst participants in real-time. For another example, a teleconference may refer to a conference in which audio signals are exchanged amongst participants over a mobile network. For yet another example, a teleconference may refer to a media conference in which different types or combinations of data are exchanged amongst participants (e.g., audio data, video data, AR/VR data, a combination of audio and video data, etc.).

Aspects of the present disclosure enable the computing system to use contextual data such as recognition of the participant's voice, recognition of the participant's face or recognition of the eye gaze of the participant. As a particular example, based on the computing system determining that a participant is intending to communicate with the other participants of the videoconference, the computing system can generate a predicted desired status of a noise gate. As used herein, a noise gate refers to an audio processor that eliminates sounds below a given threshold. For instance, an open noise gate can allow sounds above the given threshold through while filtering out sounds below the given threshold. Based on the predicted desired noise gate status, the computing system can automatically control the mute control of the participant.

Thus, the present disclosure provides a computing system and method that can be used to videoconference. The computing system can be used to provide systems and methods for automatically controlling a mute control so as to control whether the audio data associated with the participant is being transmitted to the other participants in the videoconference or not. More particularly, example aspects of the present disclosure involve computing systems and computer-implemented methods for facilitating collaboration of videoconference participants in remote locations through real-time interaction by eliminating extraneous audio transmittals in a videoconference.

The computing system can automatically control a mute control that is associated with a particular participant during a videoconference. To do so, the computing system can obtain communication data. The communication data can be associated with the participant participating in the videoconference. Specifically, the communication data can include audio and/or visual signals, which can be audio or visual signals that are associated with the particular participant. For example, the computing system can obtain video data associated with a particular participant in a videoconference (e.g., via a video data capture device of the participant, etc.). Additionally, or alternatively, the computing system can obtain audio data associated with a particular participant in a videoconference (e.g., via an audio capture device of the participant, etc.).

The computing system can process the communication data. In particular, the computing system can process the communication data by a gate control model to generate an output. In some implementations, the gate control model can be a heuristic algorithm. For example, the gate control model may be an admissible heuristic algorithm or a non-admissible heuristic algorithm. Alternatively, in some implementations the gate control model can be a machine learning model (e.g., a large neural network, etc.). The output of the gate control model may be indicative of an intent of the participant to communicate with other participants of the videoconference. For example, by processing the communication data, the gate control model can generate an output that is directed to a prediction of whether the participant is intending to communicate with the other participants of the videoconference or whether the communication data is directed to extraneous noise that is not related to the videoconference.

As a particular example, the gate control model can evaluate communication data such as video cues. For instance, the communication data associated with video cues can indicate whether the participant's mouth was moving when the communication data directed to audio data was detected. If the computing system determines that the participant's mouth was not moving, however there was concurrent audio data, the gate control model can determine that there may be a high probability (e.g., above a particular threshold) that the audio data associated with the participant is extraneous and not related to the videoconference (e.g., the audio data may be a conversation happening in the background of the participant's location). Alternatively, the communication data associated with the video cues can indicate whether the participant was turned away from the video camera or screen associated with the participant device. If the computing system determines that the participant was turned away from the participant device during the audio data, the gate control model can determine that there may be a high probability (e.g., above a particular threshold) that the audio data associated with the participant is extraneous and not related to the video conference (e.g., the audio data may be directed to a conversation that the participant is a part of on the side of the videoconference).

As another particular example, the gate control model can evaluate communication data such as audio recognition (e.g., determining an audio source for audio, recognizing a voice of a particular participant, etc.). For instance, the communication data associated with audio recognition can indicate whether the communication data associated with audio data is directed to the particular participant's voice. If the computing system determines that the audio data is not a human voice, the gate control model can determine that there may be a high probability (e.g., above a particular threshold) that the communication data is not pertinent to the videoconference (e.g., the audio data may be a dog barking in the background or otherwise extraneous noise). Alternatively, the communication data associated with the audio recognition can indicate whether it was the particular participant speaking or another person not associated with the participant device. If the computing system determines that the audio data is associated with a human voice which is not of the participant associated with the participant device, the gate control model can determine that there may be a high probability (e.g., above a particular threshold) that the audio data is not associated with the participant and is thus extraneous noise (e.g., the audio data may be directed to a conversation happening in the background of the participant's location).

As yet another particular example, the gate control model can evaluate communication data such as AR or VR contextual data (e.g., pose data, three-dimensional representation data, etc.). For example, the gate control model can evaluate the AR or VR contextual data to determine whether the participant is likely to intend to communicate with a virtualized conference. For instance, if the participant's body is turned away or facing away from the virtualized conference, the gate control model may determine that there is a low likelihood that the participant intends to communicate with the virtualized conference and may thus may determine that the audio data associated with the particular participant's device has a high probability of not being pertinent to the virtualized conference.

In some implementations, the computing system may weigh the communication data. In particular, the computing system may weigh the communication data based at least in part on a hierarchy of communication data. For instance, the communication data directed to determining if the participant's mouth is moving may be ranked higher than the communication data directed to determining if the participant is facing the camera or not. For example, the computing system may determine that particular communication data such as the participant's mouth motion is more likely to generate an accurate prediction of the participant's intent to communicate than other communication data such as the participant's facial angle. The weighted communication data may be input into the gate control model such that the gate control model generates the predicted probability directed to the participant's intent to communicate based on the weighted communication data.

In some implementations, the computing system can include feature extraction component(s). In particular, the feature extraction component(s) can extract features from the communication data. Even more particularly, the computing system can include a controller network. Specifically, the controller network can receive and process the features extracted from the communication data by the one or more feature extraction component(s). As a particular example, the controller network can include an eye gaze model. For instance, the eye gaze model can determine whether the participant's eye gaze is directed towards the participant computing device associated with the videoconference or not. In particular, the data generated by the eye gaze model can be input into the gate control model. If the participant's eye gaze is directed away from the participant computing device associated with the videoconference, the gate control model may determine that the participant is not engaging with the videoconference at those moments (e.g., the participant's attention is directed elsewhere). In some implementations, at least one of the feature extraction component(s) can be trained separately from the machine-learned model.

In some implementations, the computing system can leverage a noise gate. In particular, the noise gate may generate a noise gate status. The noise gate status can be based at least in part on the output associated with the gate control model. As a particular example, the noise gate status may be open if there is a high likelihood that the audio data associated with the communication data associated with the participant participating in the videoconference is directed towards the videoconference. Specifically, the noise gate status may be open if the probability output by the gate control model is above a predetermined threshold value. For instance, the predetermined threshold value may be set manually. Alternatively, the predetermined threshold value may be dynamically determined by a threshold value model.

As another particular example, the noise gate status may be closed if there is a low likelihood that the audio data associated with the communication data associated with the participant participating in the videoconference is directed towards the videoconference. Stated alternatively, the noise gate status may be closed if there is a high likelihood that the audio data is directed towards extraneous noise. The noise gate status may be closed if the probability output by the gate control model is below a predetermined threshold value. As discussed above, in some implementations, the predetermined threshold value may be set manually. Alternatively, in some implementations the predetermined threshold value may be dynamically determined by a threshold value model (e.g., a neural network, a statistical model, etc.).

In some implementations, the computing system can control the mute control of the participant. In particular, the computing system can automatically control the mute control of the participant. Specifically, automatic, or automated, refers to actions that do not require explicit permission or instructions from users or participants to perform. For example, a mute controlling module that dynamically mutes participant input devices without requiring permissions or instructions to perform the normalization actions can be considered automatic, or automated. As such, automatic should be broadly understood as occurring without participant interaction as used within the present disclosure. Even more particularly, the computing system can automatically control the mute control of the participant based at least in part on the noise gate status. For instance, the computing system can automatically turn on the mute function of a participant in response to the noise gate status being closed. Alternatively, the computing system can automatically turn off the mute function of a participant in response to the noise gate status being open.

In some implementations, the computing system may receive training data. In particular, the training data may be associated with the participant. Even more particularly, the computing system may train the gate control model based on the training data. For example, the training data may include a training audio signal. As a particular example, the training audio signal associated with the training data may include multiple speakers (e.g., to simulate audio data associated with a busy background with multiple conversations happening). For instance, the training data including multiple speakers may be used to train the gate control model to filter out all voices other than a specifically determined voice. As an additional particular example, the training data may include a participant input of their own voice sample via a microphone or a previously captured audio recording. For instance, the computing system can be trained to recognize the participant's own voice (e.g., out of an audio recording including a number of different voices). As yet another particular example, the training data may include a participant input of their facial features. In particular, the facial features can be input via a camera or previously captured photograph. For instance, the computing system can be trained to recognize the participant's face. For example, if a different person was in the frame of view (e.g., the participant's child, partner, etc.) the computing system may predict that it is likely that the audio data associated with this time is not directed to the videoconference.

In some implementations, the gate control model may be trained manually. In particular, the gate control model may be trained manually based on training data. Specifically, the training data can include manually generated labels associated with communication data indicative of participants who are engaged in an active state with the videoconference. For instance, the participants who are engaged with being in an active state can be manually marked. As a particular example, participants who are looking towards the computing device and speaking (e.g., verified by their mouth moving) may be marked as being engaged. By marking participants who are engaged the computing system can input those participants into the gate control model as examples of positive identification where the gate control model should predict that participants with the qualities exhibited in the marked examples have a high probability of being engaged in the videoconference.

In some implementations, the noise gate status may be calibrated. In particular, the gate control model may be calibrated by using a green room. A green room is a screen surfaced (i.e., displayed, presented, provided, etc.) to a participant prior to the participant joining the videoconference where the participant can preview and adjust video and audio settings before joining the videoconference. Even more particularly the gate control model can be calibrated by using data collected in a green room prior to entry of the participant to the videoconference. For instance, the data collected in the green room may simulate different backgrounds that a participant may have when engaging in a videoconference. As a particular example, the greenroom can simulate a participant sitting in a busy office environment as well as a participant sitting in an empty room with the same training video data.

In some implementations, the computing system can generate data indicative of a communication status. In particular, the communication status can be illustrative of the intent of the participant (e.g., to communicate with the other participants on the videoconference or not). Specifically, the data indicative of the communication status can be generated based at least in part on the noise gate status. Even more specifically, the data indicative of the communication status can be generated based at least in part on a combination of the noise gate status and the output of the gate control model. For instance, the communication status can include at least one of a color, an icon, a verbal indication, or a shape. In particular, the communication status can reflect the intent of the participant as determined by the gate control model by the use of a color, icon, verbal indication, or shape. Furthermore, the communication status can reflect the noise gate status by the use of a color, icon, verbal indication, or shape. For instance, the communication status can indicate that a participant is actively engaged and speaking by generating a green circle (e.g., thus indicating that the noise gate is open, and the participant is engaged). Alternatively, the communication status can indicate that a participant is actively engaged but not speaking by generating a yellow circle (e.g., thus indicating that the noise gate is closed, and the participant is engaged). As a further alternative, the communication status can indicate that a participant is not actively engaged by generating a yellow circle (e.g., thus indicating that the noise gate is closed, and the participant is busy). For example, other participants of the videoconference can then determine whether particular participants are prepared to actively engage in conversation (e.g., answer a question) by checking their communication status.

The systems and methods of the present disclosure provide a number of technical effects and benefits. As one example technical effect, aspects of the described technology can allow for more efficient allocation of computing resources by only using computing resources (e.g., bandwidth, processor usage, and memory usage, etc.) for audio data predicted as being relevant to the videoconference as opposed to using computing resources for all participants. This can decrease computational resources used by decreasing the amount of audio transmitted that has no impact or negative impact on the quality of the videoconference, thus decreasing the amount of redundant network transmissions. Furthermore, example embodiments can decrease the number of computing resources used by decreasing the likelihood of participants in a videoconference having to pause to determine where extraneous noises are coming from or repeating information that was hard to hear due to the extraneous noises. Thus, optimizing videoconferences and the computing resources necessary to maintain a videoconference as well as the time of the individual participants participating in the videoconference.

Furthermore, the present disclosure opens the door to a virtual workplace as opposed to merely virtually working. In particular, the virtual workplace can replicate many desirable attributes of working in person while cutting down on the undesirable attributes. By leveraging the proposed techniques in a virtual workplace, participants can more seamlessly communicate with others, thus reducing frustration, and optimizing collaboration. As discussed above, by optimizing virtual collaboration, the proposed techniques allow participants to be constantly virtually engaged in their workplace at a greatly reduced rate of transmission by reducing the number of transmissions collaborators need to send to each other to achieve the same level of cohesion and idea production, thereby saving computational resources (e.g., processor usage, memory usage, network bandwidth, etc.).

With reference now to the Figures, example embodiments of the present disclosure will be discussed in further detail.

FIG. 1 depicts an example participant-server environment 100 according to example embodiments of the present disclosure. The participant-server environment 100 includes a participant computing device 102 and a server computing system 130 that are connected by and communicate through a network 180. Although a single participant computing device 102 is depicted, any number of participant computing devices 102 can be included in the participant-server environment 100 and connect to server computing system 130 over a network 180.

In some example embodiments, the participant computing device 102 can be any suitable device, including, but not limited to, a smartphone, a tablet, a laptop, a desktop computer, or any other computer device that is configured such that it can allow a participant to participate in a videoconference. The participant computing device 102 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the participant computing device 102 and the server computing system 130 (e.g., one or more video conferencing applications 122, etc.). The participant computing device 102 can implement the instructions to execute aspects of the present disclosure, including directing communications with server computing system 130, providing a video conferencing application 122 and/or video stream to a participant, processing requests from participants for execution of a multi-interaction display, and determining and providing data indicative of the current state of the interaction display.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, which are stored in a tangible computer-readable storage medium such as RAM, hard disk, or optical or magnetic media.

Memory 114 can also include data 116, such as video conferencing data (e.g., captured at the participant computing device 102 or received from the server computing system 130), that can be retrieved, manipulated, created, or stored by the one or more processor(s) 112. In some example embodiments, such data can be accessed and displayed to participant(s) of the participant computing device 102 during a videoconference or transmitted to the server computing system 130.

The participant computing device 102 can execute a video conferencing application 122. The video conferencing application can capture image data from a camera 124 and transmit that data to the server computing system. The participant computing device 102 can receive from the server computing system 130 image data from other participant(s) of the videoconference (e.g., other participant computing devices 102). The participant computing device 102 can then display the received image data to participants of the participant computing device 102 on associated display device 120. In some example embodiments, the camera 124 collects image data from participant(s). The camera can be any device capable of capturing visual data.

More particularly, the participant computing device 102 can receive video streams from the server computing system 130. The participant computing device 102 can, as an example, display the received video streams in the associated display device 120 (e.g., a laptop display device, a smartphone display device, a communicatively connected display device, etc.) including a multi-participant interaction display. For example, the participant computing device 102 can receive a request from a first participant at a first participant device for execution of a multi-participant interaction display within the GUI provided by the video conferencing system. The GUI can include a number of displays associated with respective video streams of participants. The multi-participant interaction display can include computer executable code that is responsive to inputs provided by multiple participants at respective participant devices.

Additionally, or alternatively, in some implementations, the participant computing device 102 can generate a video stream and send the video stream to the server computing system 130 (e.g., via network(s) 180). More particularly, the participant computing device 102 can capture a video stream using camera 124 (e.g., an integrated webcam, communicatively connected camera device, etc.). The participant computing device 102 can encode the captured video (e.g., as specified by instructions 118, etc.). As a further example, the camera 124 may be configured to capture two-dimensional video data of a user of the participant computing device 102 (e.g., for broadcast, etc.). In some implementations, the camera 124 may include a number of camera devices communicatively coupled to the participant computing device 102 that are configured to capture image data from different poses for generation of three-dimensional representations (e.g., a representation of a user of the participant computing device 102, etc.).

The participant computing device 102 can also include one or more participant input components which are not pictured that receive user input. For example, the participant input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example participant input components include a microphone, a traditional keyboard, or other means by which a participant can provide user input. As further examples, the input component may include audio capture devices, such as microphones. In some implementations, the input component may include sensor devices configured to capture sensor data indicative of movements of a user of the participant computing device 102 (e.g., accelerometer(s), Global Positioning Satellite (GPS) sensor(s), gyroscope(s), infrared sensor(s), head tracking sensor(s) such as magnetic capture system(s), an omnidirectional treadmill device, sensor(s) configured to track eye movements of the user, etc.).

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more participant computing device(s) 102 using a network communication device that is not pictured. The network 180 can be any type of communications network, such as a local area network (e.g., intranet), wide area network (e.g., Internet), or some combination thereof. In general, communication between the participant computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by participant computing device(s) 102. As an example, the video conferencing system 140 can receive video streams from a number of participant computing devices 102 (e.g., via network 180) respectively associated with a number of videoconference participants. The video conferencing system 140 can provide the video streams to each of the participant computing devices 102. Further, the video conferencing system 140 can manage provided stream quality. In some implementations, the video conferencing system 140 can manage provided stream quality by transmitting requests to participant computing devices 102 to provide video streams with a certain quality and/or resolution. In such fashion, the server computing system 130 can utilize video conferencing system 140 to facilitate the functionality of the video conferencing applications 122 on each participant computing device 102.

It is noted that video conferencing application 122 can be considered part of the video conferencing system 140 in example embodiments. In various examples, video conferencing application 122 and/or video conferencing system 140 can determine a current state of the multi-participant interaction display in response to inputs provided by the first participant at participant computing device 102 as well as inputs from other participants at other participant devices. The video conferencing application and/or system can provide data for rendering the GUI. The data can include video data associated with participants for respective displays of the GUI and data indicative of the current state of the multi-participant interaction display. The data indicative of the current state can include content data representing the current state or state data allowing other computing devices to retrieve content representing the current state. For example, data 116 and/or 136 may include content data and/or state data in accordance with example embodiments. Content data may provide content that is rendered at the participant computing device 102. State data may provide instructions, commands, or other information for the video conferencing application 122 to maintain a current state with other participant devices.

Figure 2A:
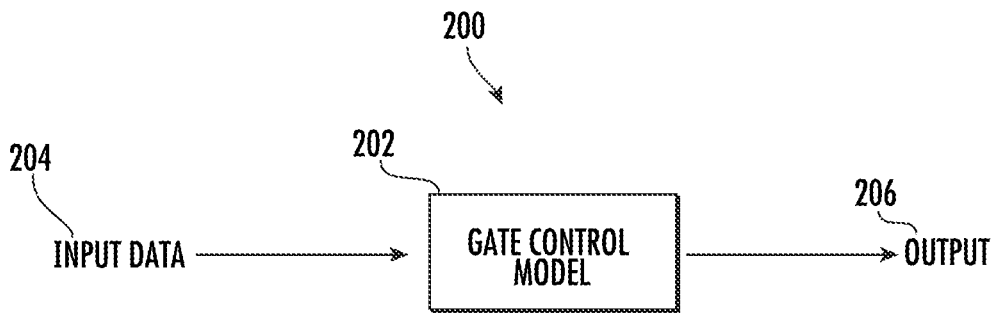
FIG. 2A depicts a block diagram of an example mute control system model 200 according to example embodiments of the present disclosure.

FIG. 2A depicts a block diagram of an example mute control system model 200 according to example embodiments of the present disclosure. In some implementations, the mute control system model 200 is trained to receive a set of input data 204 descriptive of raw participant data and, as a result of receipt of the input data 204, provide output data 206 that includes a prediction of whether a particular participant is actively engaged and intending to communicate with the other participants of a videoconference. Thus, in some implementations, the mute control system model 200 can include gate control model 202 that is operable to generate a probability of whether a particular participant is actively engaged and intending to communicate with the other participants of a videoconference.

In particular, gate control model 202 can leverage the input data 204 to determine a probability of whether a particular participant is actively engaged and intending to communicate with the other participants of a videoconference based on input data 204. For instance, the gate control model 202 can predict the probability of whether a particular participant is actively engaged and intending to communicate with the other participants of a videoconference based on the input data 204.

Figure 2B:
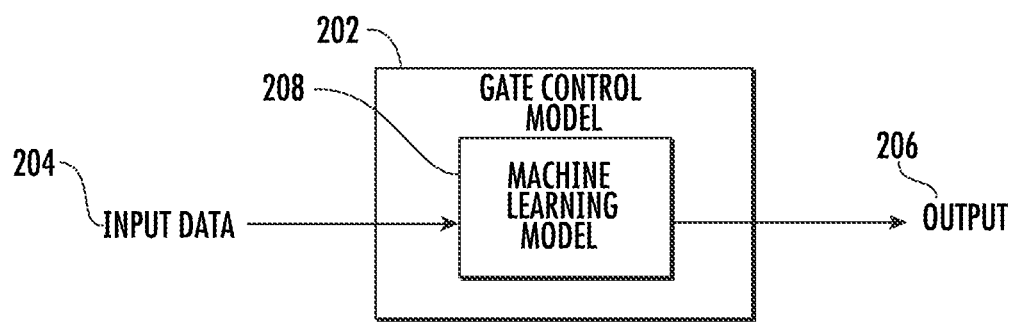
FIG. 2B depicts a second block diagram of an example mute control system model 200 according to example embodiments of the present disclosure.

FIG. 2B depicts a second block diagram of an example mute control system model 200 according to example embodiments of the present disclosure. In some implementations, the gate control model 202 can further include a machine-learning model 208. Specifically, the input data can be input directly into the machine-learning model 208. In particular, the machine-learning model 208 can be a machine-learned image classification model. For example, the machine-learned image classification model can be used to detect how engaged a participant is (e.g., by leveraging features such as semantic analysis (discriminative, generative, cognitive, etc.) by training on historical participant data. As another example, the machine-learned image classification model can be used to predict how engaged a participant is by training on data generalized from a number of participants. As one example, a machine-learned image classification model can be trained to classify an image input by a participant into different probabilities of engagement. As one example, the classification model can be trained using a supervised learning approach on a training dataset that includes training data pairs. Each pair of training data can include an image of a person or scene and a ground truth label that indicates a ground truth semantic status of the person or scene. For example, the machine-learned image classification model can be used to detect the probability of whether a particular participant is actively engaged and intending to communicate with the other participants of a videoconference (e.g., identified objects, identified people, etc.) by training on historical participant data. As another example, the machine-learned image classification model can be used to detect the probability of whether a particular participant is actively engaged and intending to communicate with the other participants of a videoconference by training on data generalized from participants.

Alternatively, the gate control model 202 can include a machine-learned textual classification model as the machine-learning model 208. For example, the machine-learned textual classification model can be used to detect the affinity classification of the participant (e.g., by leveraging features such as textual analysis (Naive Bayes, support vector machines, deep learning, etc.)) by training on historical participant data. As another example, the machine-learned textual classification model can be used to detect the affinity classification of the participant by training on data generalized from participants. As one example, a machine-learned textual classification model can be trained to classify text input by a participant probability of whether a particular participant is actively engaged and intending to communicate with the other participants of a videoconference much like the machine-learned image classification model described above.

In some implementations, the gate control model 202 can include a machine-learned image generation model as the machine-learning model 208. The machine-learned image generation model can include machine-learned encoder and decoder models. The machine-learned encoder and decoder models can be used to generate the generalized representation of the participant. For example, the encoder can receive the raw image of the participant and/or reference image(s) and encode the image(s) to a latent representation (which can also be referred to as a neural representation) that describes the subject depicted in the image(s). The decoder can expand the latent representation to a generalized identification of the subject matter contained in the image.

In some implementations, the encoder model and the decoder model can each be convolutional neural networks. In some implementations, the encoder model and the decoder model can be stored and run on the same device while in other implementations the encoder model and the decoder model can be stored and run on separate devices (e.g., a sender and a receiver device). In some implementations, the encoder model is the same as the gate control model 202 while in other implementations they are different models. Thus, various combinations of model(s) can be used to determine the semantic status of a participant and to generate a generalized video representation of the participant that depicts the semantic status.

Figure 2C:
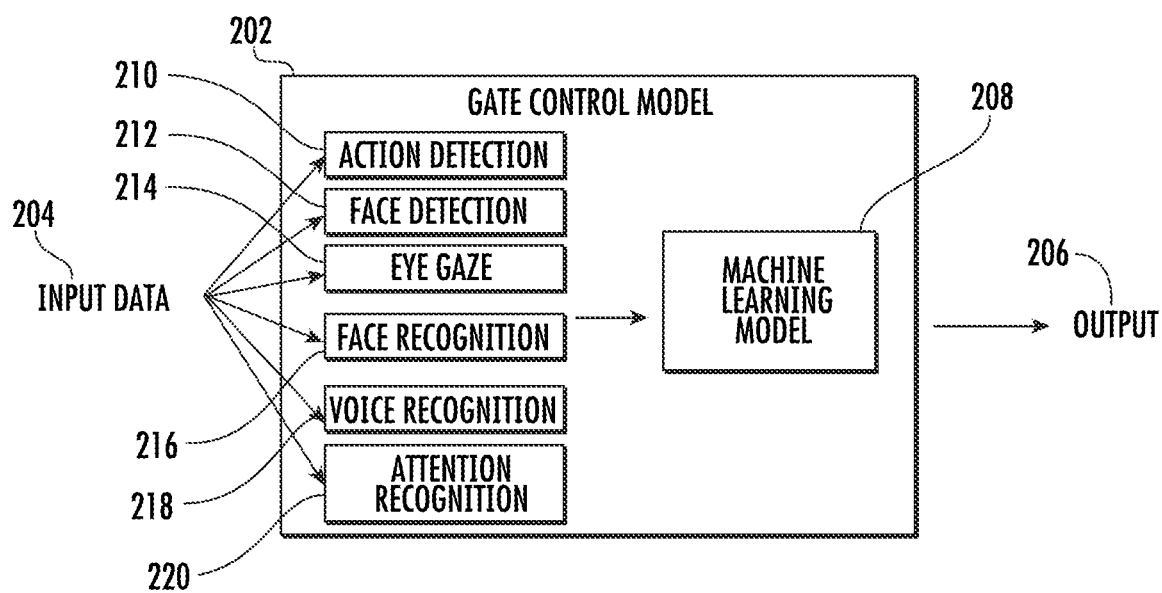
FIG. 2C depicts a third block diagram of an example mute control system model 200 according to example embodiments of the present disclosure.

FIG. 2C depicts a third block diagram of an example mute control system model 200 according to example embodiments of the present disclosure. In some implementations, the gate control model 202 can further include feature extraction component(s). Specifically, the input data can be input directly into the feature extraction component(s). In particular, an example feature extraction component can include an eye gaze model 214. Even more particularly, the eye gaze model 214 can process the visual signal of the communication data included in the input data 204 to determine a gaze location of the participant. For instance, the eye gaze model 214 can determine whether the participant is looking at the display associated with the videoconference or not. Another example feature extraction component can include a voice recognition model 218. Even more particularly, the voice recognition model 218 can process the auditory signal of the communication data included in the input data 204 to determine vocal recognition of the participant. For instance, the voice recognition model 218 can determine whether the auditory signal indicates that the participant associated with the videoconference is speaking or if the auditory signal is directed to a third party. Another example feature extraction component can include a facial detection model 212. Even more particularly, the facial detection model 212 can process the visual signal of the communication data included in the input data 204 to determine facial cues of the participant. For instance, the facial detection model 212 can determine whether the facial cues of the participant indicate communication with the videoconference such as nodding or shaking of the head. Another example feature extraction component can include a facial recognition model 216. Even more particularly, the facial recognition model 216 can process the visual signal of the communication data included in the input data 204 to determine facial recognition of the participant. For instance, the facial recognition model 216 can determine whether the individual depicted in the visual signal is the participant associated with the videoconference or not. Another example feature extraction component can include an action detection model 210. Even more particularly, the action detection model 210 can process the visual signal of the communication data included in the input data 204 to determine body cues of the participant. For instance, the action detection model 210 can determine whether the participant's actions indicate communication with the videoconference such as giving a thumbs up or thumbs down. Another example feature extraction component can include an attention recognition model 220. Even more particularly, the attention recognition model 220 can process the visual signal of the communication data included in the input data 204 to determine the attention of the participant. For instance, the attention recognition model 220 can determine whether the participant is paying attention to the videoconference even if the participant is not directly communicating at the moment. In particular, the feature extraction component(s) can output data to the machine-learning model 208 such that the machine-learning model 208 can generate output data 206 that includes a prediction of whether a particular participant is actively engaged and intending to communicate with the other participants of a videoconference The mute control system model 200 can leverage the output of the gate control model 202 to control a mute function of a participant participating in a videoconference. Even more particularly, the mute control system model 200 can leverage the input data 204 in combination with the output of the gate control model 202 to generate the output data 206 which could include the data directed to activating or deactivating a mute function of a participant participating in a videoconference.

Figure 3:
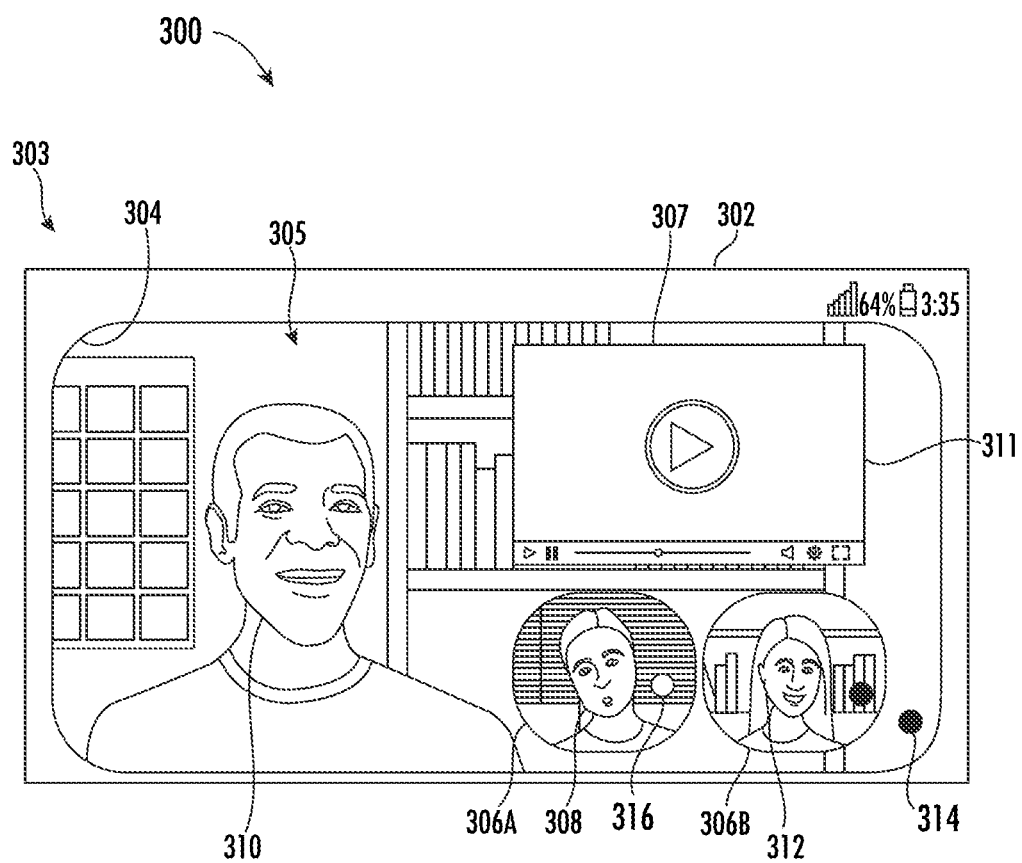
FIG. 3 depicts an example graphical participant interfaces of a multi-participant videoconferencing system according to example embodiments of the present disclosure.

FIG. 3 depicts an example graphical participant interface of a multi-participant video conferencing application 122 and video conferencing system 140 according to example embodiments of the present disclosure. As shown at 300, participant device 302 (e.g., a smartphone, tablet, laptop computer, etc.) can display a video stream of a first participant 310 in a primary display region of GUI 305. In some examples, the speaking role of the first participant 310 can be a dominant speaking role (e.g., the participant that is currently speaking, etc.) and based on the dominant speaking role of the first participant 310, the participant device 302 can display the video stream of the first participant 310 in primary display 304. Alternatively, the first participant 310 may occupy the primary display 304 based on the first participant 310 being associated with the particular participant device 302 (e.g., the participant whose participant device it is may be displayed prominently).

Although the primary display 304 is depicted as using the entirety of the display of participant device 302, it should be noted that the primary display 304 does not necessarily need to do so. As an example, the primary display 304 may use 80% of the available display of the participant device 302.

The participant device 302 can display a video stream for a second participant 308 and a video stream for a third participant 312 in video displays 306A and 306B. For example, the speaking roles of second participant 308 and third participant 312 can be non-dominant speaking roles (e.g., the participants that are not currently speaking, etc.). Based on the non-dominant speaking roles of the second participant 308 and the third participant 312, the participant device 302 can display the video streams of the second participant 308 and the third participant 312 respectively in the video displays 306A and 306B. Additionally, or alternatively, it should be noted that the video displays 306A and 306B do not necessarily need to be overlaid on the primary display 304. In some implementations, the video displays 306A and 306B can instead be displayed adjacent to the primary display 304. Additionally, or alternatively, it should be noted that the video displays 306A and 306B do not necessarily need to be smaller in size than the display associated with the dominant speaking role. In some implementations, all video displays can be of equal sizing. Additionally, three video displays are provided by way of example only. A multi-participant videoconference may include any number of displays and associated video streams.

At 303, GUI 305 is depicted with an interaction display 307 hosting a participant screen sharing presentation 311. For example, the participant screen sharing presentation 311 can show a video player application. As another example, the participant screen sharing presentation 311 can show a slideshow, web browser, document, or any other content a participant shares.

At 314, GUI 305 is depicted with a first communication status icon 314. In particular, the first communication status icon 314 may indicate that participants such as first participant 310 and third participant 312 displaying this particular first communication status icon 314 are engaged with the videoconference in a particular manner. As a particular example, the first communication status icon 314 may indicate that first participant 310 is engaged with the videoconference but is not actively communicating at the moment. Thus, the first communication status icon 314 can indicate that first participant 310 is paying attention and is ready to answer any questions, however their microphone is muted at the moment to prevent extraneous noises from being included in the videoconference. Alternatively, a different second communication status icon 316 may indicate a different engagement with the videoconference. For example, the second communication status icon 316 may indicate that participants associated with the second communication status icon 316 such as second participant 308 are actively engaged and communicating with the videoconference. Thus, the second communication status icon 316 can indicate that the second participant 308 is currently unmuted and talking.

Figure 4:
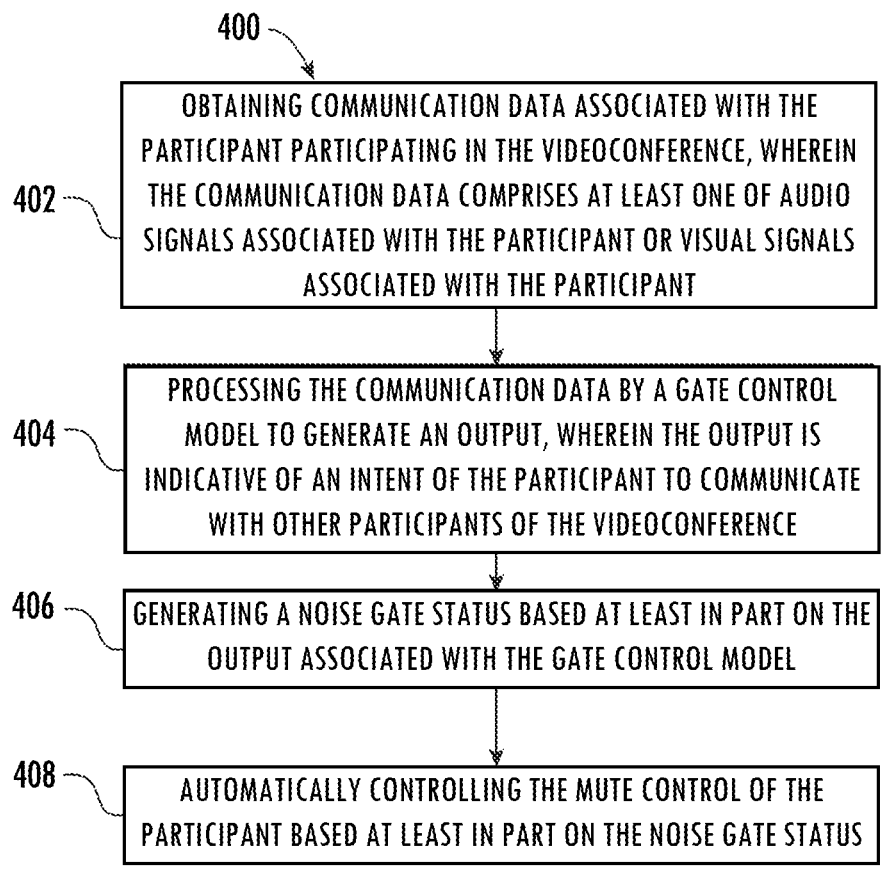
FIG. 4 depicts a flow diagram for providing a multi-participant videoconference according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At operation 402, the computing system can obtain communication data. Specifically, the communication data can be associated with the participant participating in the videoconference. Even more specifically, the communication data can include at least one of audio or visual signals, wherein the audio or visual signals can be associated with the particular participant. For example, the computing system can obtain data associated with a video camera associated with a particular participant in a videoconference. As a particular example, the video camera can be associated with a particular participant device which is associated with the particular participant. Furthermore, the computing system can obtain data associated with a microphone associated with a particular participant in a videoconference. Continuing the particular example, the microphone can be associated with a particular participant device which is associated with the particular participant.

At operation 404, the computing system can process the communication data. In particular, the computing system can process the communication data by a gate control model. For example, the gate control model can be a heuristic algorithm. Alternatively, the gate control model can be a machine learning model (e.g., wherein the machine learning model can include a large neural network). Even more particularly, the gate control model can generate an output. Specifically, the output of the gate control model may be indicative of an intent of the participant to communicate with other participants of the videoconference. For example, the gate control model can take into account the communication data to generate an output directed to a prediction of whether the participant is intending to communicate with the other participants of the videoconference or whether the communication data is directed to extraneous noise that is not related to the videoconference.

As a particular example, the gate control model can evaluate communication data such as video cues. For instance, the communication data associated with video cues can indicate whether the participant's mouth was moving when the communication data directed to audio data was detected. If the computing system determines that the participant's mouth was not moving, however there was concurrent audio data, the gate control model can determine that there may be a high probability (e.g., above a particular threshold) that the audio data associated with the participant is extraneous and not related to the videoconference (e.g., the audio data may be a conversation happening in the background of the participant's location). Alternatively, the communication data associated with the video cues can indicate whether the participant was turned away from the video camera or screen associated with the participant device. If the computing system determines that the participant was turned away from the participant device during the audio data, the gate control model can determine that there may be a high probability (e.g., above a particular threshold) that the audio data associated with the participant is extraneous and not related to the video conference (e.g., the audio data may be directed to a conversation that the participant is a part of on the side of the videoconference).

As another particular example, the gate control model can evaluate communication data such as audio recognition. For instance, the communication data associated with audio recognition can indicate whether the communication data associated with audio data is directed to the particular participant's voice. If the computing system determines that the audio data is not a human voice, the gate control model can determine that there may be a high probability (e.g., above a particular threshold) that the communication data is not pertinent to the videoconference (e.g., the audio data may be a dog barking in the background or otherwise extraneous noise). Alternatively, the communication data associated with the audio recognition can indicate whether it was the particular participant speaking or another person not associated with the participant device. If the computing system determines that the audio data is associated with a human voice which is not of the participant associated with the participant device, the gate control model can determine that there may be a high probability (e.g., above a particular threshold) that the audio data is not associated with the participant and is thus extraneous noise (e.g., the audio data may be directed to a conversation happening in the background of the participant's location).

At operation 406, the computing system can generate a noise gate status. In particular, the noise gate status can be based at least in part on the output associated with the gate control model. As a particular example, the noise gate status may be open if there is a high likelihood that the audio data associated with the communication data associated with the participant participating in the videoconference is directed towards the videoconference. Specifically, the noise gate status may be open if the probability output by the gate control model is above a predetermined threshold value. For instance, the predetermined threshold value may be set manually. Alternatively, the predetermined threshold value may be dynamically determined by a threshold value model.

As another particular example, the noise gate status may be closed if there is a low likelihood that the audio data associated with the communication data associated with the participant participating in the videoconference is directed towards the videoconference. Stated alternatively, the noise gate status may be closed if there is a high likelihood that the audio data is directed towards extraneous noise. Specifically, the noise gate status may be closed if the probability output by the gate control model is below a predetermined threshold value. As discussed above, the predetermined threshold value may be set manually. Alternatively, the predetermined threshold value may be dynamically determined by a threshold value model.

At operation 408, the computing system can control the mute control of the participant. In particular, the computing system can automatically control the mute control of the participant. Even more particularly, the computing system can automatically control the mute control of the participant based at least in part on the noise gate status. For instance, the computing system can automatically turn on the mute function of a participant in response to the noise gate status being closed. Alternatively, the computing system can automatically turn off the mute function of a participant in response to the noise gate status being open.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for automatically controlling a mute control associated with a participant during a videoconference portion of a communication session, the method comprising:
obtaining, by a computing system comprising one or more processors, communication data associated with the participant participating in the communication session, wherein the communication data comprises audio signals associated with the participant and visual signals associated with the participant, wherein a first portion of the communication data is obtained during a portion of the communication session that occurs prior to the videoconference portion;
processing, by the computing system, the communication data by a gate control model comprising a machine-learned model to generate an output, wherein the output is indicative of an intent of the participant to communicate with other participants of the videoconference, wherein the gate control model is trained to extract features from the visual signals associated with the participant to determine a degree of attention of the participant towards the communication session, and wherein the visual signals are weighted higher than the audio signals when generating the output;
calibrating, by the computing system, the gate control model using the communication data during the portion of the communication session that occurs prior to the videoconference portion;
generating, by the computing system, a noise gate status based at least in part on the output associated with the gate control model; and
automatically controlling, by the computing system, the mute control of the participant to mute the participant in the videoconference based at least in part on the noise gate status.

2. The computer-implemented method of claim 1, further comprising, prior to obtaining communication data associated with a participant:
receiving, by the computing system, training data associated with the participant; and
training, by the computing system, the gate control model based on the training data.

3. The computer-implemented method of claim 2, wherein the training data comprises a training audio signal and wherein the training audio signal further comprises additional audio signals associated with speakers other than the participant.

4. The computer-implemented method of claim 1, wherein the noise gate status comprises:
open; or
closed.

5. The computer-implemented method of claim 1, wherein the machine-learned model directly receives and processes the communication data to generate the output.

6. The computer-implemented method of claim 1, wherein the gate control model further comprises one or more feature extraction components that extract features from the communication data, wherein the one or more feature extraction components comprises an an attention recognition model that processes the visual signals of the communication data to determine the degree of attention of the participant, and wherein the machine-learned model comprises a controller network that receives and processes the features extracted from the communication data by the one or more feature extraction components to generate the output.

7. The computer-implemented method of claim 6, wherein at least one of the one or more feature extraction components has been trained separately from the machine-learned model.

8. The computer-implemented method of claim 6, wherein the one or more feature extraction components comprise a plurality of feature extraction components, comprising the attention recognition model and at least one of:
an eye gaze model that processes the visual signals of the communication data to determine a gaze location of the participant;
a voice recognition model that processes the audio signals of the communication data to determine vocal recognition of the participant;
a facial detection model that processes the visual signals of the communication data to determine facial cues of the participant;
a facial recognition model that processes the visual signals of the communication data to determine facial recognition of the participant; or an action detection model that processes the visual signals of the communication data to determine body cues of the participant.

9. The computer-implemented method of claim 1 wherein the gate control model evaluates:
   video cues; and
   audio recognition.

10. The computer-implemented method of claim 2, wherein the training data comprises:
    participant input of their own voice samples; and
    facial features via camera.

11. The computer-implemented method of claim 1, further comprising:
    training, by the computing system, the gate control model based on training data, the training data comprising manually generated labels associated with communication data indicative of participants who are engaged in an active state with a videoconference.

12. The computer-implemented method of claim 1, further comprising:
    generating, by the computing system, data indicative of a communication status, wherein the communication status is illustrative of the intent of the participant.

13. The computer-implemented method of claim 12, wherein the communication status comprises at least one of:
    a color;
    an icon;
    a verbal indication; or
    a shape.

14. A computing system, comprising:
    one or more processors; and
    one or more non-transitory, computer-readable media that store instructions that when executed by the one or more processors cause the computing system to perform operations, the operations comprising:
    obtaining, by a computing system comprising one or more processors, communication data associated with a participant of a communication session, wherein the communication data comprises audio signals associated with the participant and visual signals associated with the participant, wherein a first portion of the communication data is obtained during a portion of the communication session that occurs prior to a videoconference portion;
    processing, by the computing system, the communication data by a gate control model comprising a machine-learned model to generate an output, wherein the output is indicative of an intent of the participant to communicate with other participants of the videoconference, wherein the gate control model is trained to extract features from the visual signals associated with the participant to determine a degree of attention of the participant towards the communication session, and wherein the visual signals are weighted higher than the audio signals when generating the output;
    calibrating, by the computing system, the gate control model using the communication data during the portion of the communication session that occurs prior to the videoconference portion;
    generating, by the computing system, a noise gate status based at least in part on the output associated with the gate control model; and
    automatically controlling, by the computing system, a mute control of the participant to mute the participant in the videoconference portion based at least in part on the noise gate status.

15. The computer system of claim 14, further comprising, prior to obtaining communication data associated with a participant:
    receiving, by the computing system, training data associated with the participant; and
    training, by the computing system, the gate control model based on the training data.

16. One or more non-transitory computer-readable media that store instructions that, when executed by one or more processors of a computing system, cause the computing system to perform operations comprising:
    receiving training data associated with a participant of a communication session, wherein the training data comprises a training audio signal and wherein the training audio signal further comprises additional audio signals associated with speakers other than the participant;
    training a gate control model comprising a machine-learned model based on the training data;
    obtaining communication data associated with the participant, wherein the communication data comprises audio signals associated with the participant and visual signals associated with the participant, wherein a first portion of the communication data is obtained during a portion of the communication session that occurs prior to a videoconference portion, wherein the gate control model is trained to extract features from the visual signals associated with the participant to determine a degree of attention of the participant towards the communication session, and wherein the visual signals are weighted higher than the audio signals when generating the output;
    processing the communication data by the gate control model to generate an output, wherein the output is indicative of an intent of the participant to communicate with other participants of the videoconference;
    calibrating the gate control model using the communication data during the portion of the communication session that occurs prior to the videoconference portion;
    generating a noise gate status based at least in part on the output associated with the gate control model; and
    automatically controlling a mute control of the participant in the videoconference to mute the participant based at least in part on the noise gate status.

* * * * *